T. E. Marable,
Clover Harvester.
No. 14,570. Patented April 1, 1856.

UNITED STATES PATENT OFFICE.

THOMAS E. MARABLE, OF PETERSBURG, VIRGINIA.

IMPROVED MACHINE FOR GATHERING SEEDS OR GRAIN IN THE FIELD.

Specification forming part of Letters Patent No. 14,570, dated April 1, 1856.

*To all whom it may concern:*

Be it known that I, THOMAS E. MARABLE, of Petersburg, in the county of Dinwiddie and State of Virginia, have invented certain new and useful Improvements in Machines for Gathering Seeds or Grain in the Feld without Gathering the Stalks or Heads; and I do hereby declare the following to be a full, clear, and exact description of the same, reference being had to the accompanying drawings, in which—

Figure 2:
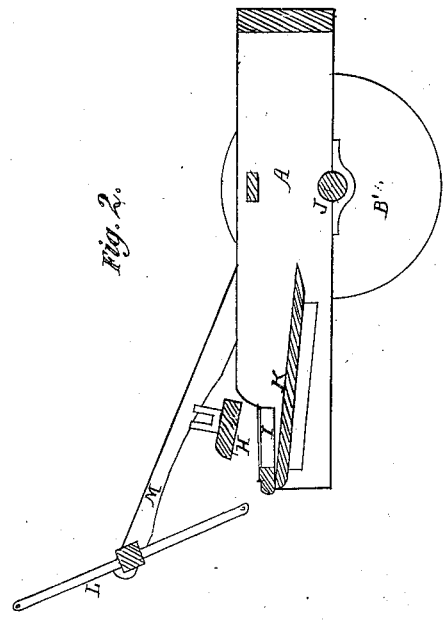
Figure 4:
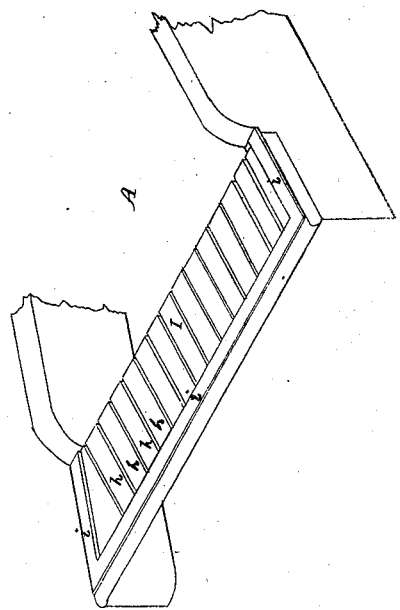
Figure 1:
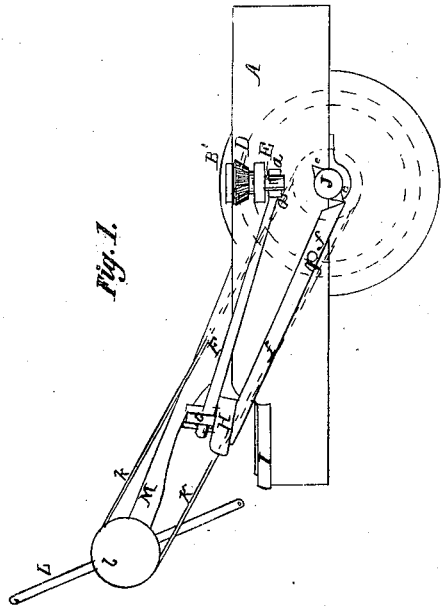
Figure 3:
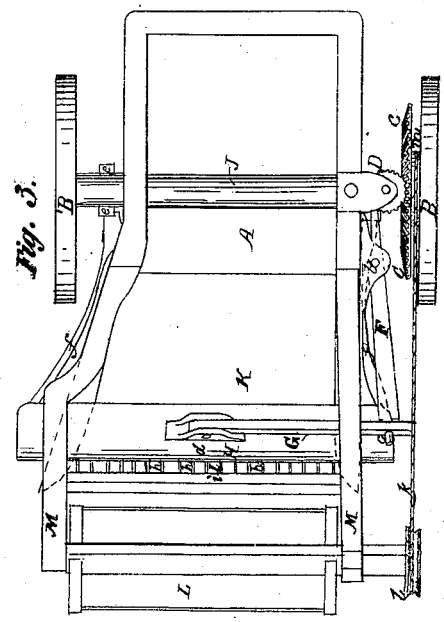

Figure 1 represents a view from one of the sides with the wheel removed to show the parts behind it. Fig. 2 represents a longitudinal vertical section through the machine. Fig. 3 represents a top plan; and Fig. 4 represents, on an enlarged scale, a perspective view of the rubbing-board in front of the machine.

Similar letters, where they occur in the several drawings, denote like parts in all.

The nature of my invention relates to a combination of a reel, a movable rubber, and a stationary rubbing-board for gathering in and rubbing out seeds of any kind in the field without gathering the stalks and heads.

To enable others skilled in the art to make and use my invention, I will proceed to describe the same with reference to the drawings.

A represents a receptacle for receiving the seeds or grains to be gathered. It is mounted on wheels B B', and that part of the front of the machine which runs next the ungathered seeds projects laterally sufficiently far to gather the seeds which would be in the line of the wheel B', and which otherwise would be crushed down by the passing wheel. On the inside face of the wheel B is a bevel-wheel, C, Fig. 3, which meshes with and gives motion to a bevel-spur, D, on a shaft, E. In the lower end of the shaft E are two projections, $a\ a$, which as the shaft revolves strike against a lever, F, pivoted at $b$, and cause said lever to vibrate. The front end of the lever F is connected by a loose or toggle joint at $c$ to a rod, G, the other end of said rod being connected at $d$ to the rubber H, so that the rubber H shall have a transverse rubbing motion upon or over the stationary board I underneath it.

On the axle J, which turns with the wheels B B', are arranged, at each end thereof, between the wheel and box A, cams $e\ e\ e\ e$, which as the axle rotates strikes against the ends of levers $f\ f$, pivoted at $g$, Fig. 1, and cause the front ends of these levers to rise and fall perpendicularly. The front ends of the levers $f\ f$ are connected to the opposite ends of the rubber H, and give to said rubber a rising-and-falling motion in addition to the transverse movement it receives through the levers F. The rubber H may have its rubbing-surface covered with emery or the like material for some purposes, and with india-rubber or similar soft material when the seeds are of a kind more readily separated from their coverings. The levers $f\ f$ are cut away, as seen in Fig. 3, to allow them to bend in a horizontal direction, so as to accommodate the transverse movement of the rubber H. The rubbing-board I may be a series of slats, $h$, or may have slots or grooves cut in them, through or into which the seeds may pass when rubbed out, and, falling upon an inclined board, K, be directed back into the receiving-box A, the bottom of which box may be of canvas or any other material to contain the gathered seeds. Around the margin of the rubbing-board I are ledges $i\ i\ i$, raised slightly above the top surface of said board. The object of these ledges is to prevent the rubbing-board H from pressing too heavily on the seeds, which might crush them, and these ledges, to adapt the machine to various-sized seeds, may be adjustable or removable.

L is a reel, driven by an endless belt, $k$, passing around a pulley, $l$, on the reel-shaft, and a pulley, $m$, on the axle J, said reel being supported in the reel-posts M. As it is necessary for the reel to deliver the heads at stated periods between the rubbing-boards—viz., at the exact time that the upper or movable board H is raised up by the action of the levers $f$—it should be positively geared to the driving-axle or other moving part of the machine, so that the wings shall present the heads at the proper time. For this purpose a chain or link belt which catches over studs upon the pulleys may be used.

The operator may ride upon the machine or walk by the side of it, and it may be provided with a lever or other device for raising or lowering the machine to suit the height of the heads to be gathered in between the rubbers, and it may be drawn by horses at the side or behind the machine, or trundled by hand; but these things, being common to reaping and mowing machines, need not be more particularly described here.

Having thus fully described the nature of my invention, what I claim therein as new, and desire to secure by Letters Patent, is—

In combination with a gatherer for drawing in the heads, the rubbing-board having a vertical movement for receiving the heads under it and then dropping down, and having a transverse rubbing motion for rubbing out the seeds or grain, substantially as herein described.

THOMAS E. MARABLE.

Witnesses:
A. B. STOUGHTON,
THOS. H. UPPERMAN.